United States Patent
Mitchell et al.

(10) Patent No.: US 9,550,120 B2
(45) Date of Patent: Jan. 24, 2017

(54) TOLL IMAGE REVIEW GAMIFICATION

(71) Applicant: Cubic Corporation, San Diego, CA (US)

(72) Inventors: Charles F. Mitchell, Tillson, NY (US); Dennis Moore, New Paltz, NY (US); Ashok Sinha, Eden Prairie, MN (US); Michael Sinha, Eden Prairie, MN (US); Stephen Bliss, Hurley, NY (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/018,081

(22) Filed: Feb. 8, 2016

(65) Prior Publication Data

US 2016/0228769 A1 Aug. 11, 2016

Related U.S. Application Data

(60) Provisional application No. 62/113,969, filed on Feb. 9, 2015.

(51) Int. Cl.
*G06K 9/46* (2006.01)
*A63F 13/35* (2014.01)

(52) U.S. Cl.
CPC .............. *A63F 13/35* (2014.09); *G06K 9/46* (2013.01); *G06K 2009/4666* (2013.01)

(58) Field of Classification Search
CPC ................................ A63F 13/35; G06K 9/46
See application file for complete search history.

(56) References Cited

U.S. PATENT DOCUMENTS

| | | | |
|---|---|---|---|
| 2002/0140577 A1* | 10/2002 | Kavner ................. | G07B 15/06 340/933 |
| 2008/0095406 A1* | 4/2008 | Kaga ..................... | G07B 15/04 382/105 |
| 2008/0212837 A1* | 9/2008 | Matsumoto .......... | G06K 9/3233 382/105 |
| 2009/0310879 A1 | 12/2009 | Im | |

(Continued)

OTHER PUBLICATIONS

International Search Report and Written Opinion mailed May 31, 2016 for International Application No. PCT/US2016/017174, filed Feb. 9, 2016; all pages.

(Continued)

*Primary Examiner* — Corbett B Coburn
(74) *Attorney, Agent, or Firm* — Kilpatrick Townsend & Stockton LLP

(57) ABSTRACT

A method for gamifying a toll image review process includes receiving an image of a vehicle that has utilized a toll road and identifying a region of interest of the image depicting an identifier of the vehicle. A second image is generated that includes the region of interest and is preprocessed to generate a plurality of images of the region of interest. Each of the images includes unique display settings. The images are displayed within a graphical user interface along with progress information for a first user. The progress information is related to an amount of vehicles to identify. Progress information is displayed for additional users. An input including the identifier is received using the user interface. Images related to an image of a second vehicle's region of interest are displayed. A progress of the additional users is monitored and then the displayed progress information is updated.

26 Claims, 5 Drawing Sheets

(56) References Cited

U.S. PATENT DOCUMENTS

| | | | |
|---|---|---|---|
| 2011/0084126 A1* | 4/2011 | Fleming | G09F 3/0297 |
| | | | 235/375 |
| 2012/0148105 A1 | 6/2012 | Burry et al. | |
| 2013/0291065 A1 | 10/2013 | Jakowski et al. | |
| 2014/0051506 A1 | 2/2014 | Ameling et al. | |
| 2014/0321775 A1 | 10/2014 | Wu et al. | |
| 2014/0355836 A1* | 12/2014 | Kozitsky | G06K 9/3258 |
| | | | 382/105 |
| 2015/0371109 A1* | 12/2015 | Vo | G06K 9/00785 |
| | | | 382/105 |
| 2016/0070986 A1* | 3/2016 | Chidlovskii | G06K 9/00785 |
| | | | 382/104 |

OTHER PUBLICATIONS

Nick T.; "Check out the iOS 7 camera filters and video zooming in action"; Phonearena.com; Jun. 17, 2013; XP055274175; retrieved on May 20, 2016 from <http://www.phonearena.com/news/Check-out-the-iOS-7-camera-filters-and-video-zooming-in-action-id44139>.

* cited by examiner

TOLL IMAGE REVIEW GAMIFICATION

CROSS-REFERENCES TO RELATED APPLICATIONS

This Application claims priority to U.S. Provisional Patent Application No. 62/113,969 filed Feb. 9, 2015, entitled "TOLL IMAGE REVIEW UXD GAMIFICATION," the entire disclosure of which is hereby incorporated by reference, for all purposes, as if fully set forth herein.

BACKGROUND OF THE INVENTION

Toll image processing requires a user to review a number of images of license plates to identify vehicles that have utilized a stretch of road that requires a toll. Such image review can be a tedious job, which makes it difficult to motivate employees to work quickly, while ensuring that accuracy rates are maintained at acceptable levels. Oftentimes, an image of a license plate is difficult to read, requiring the user to adjust image processing controls in an attempt to make the image more readable. This requires the user to move his hands from a keyboard or other input device and use a mouse or comparable device to manipulate one or more sliders or other image processing settings to adjust the appearance of the image. Not only does this manipulation take time, but it requires the user to remove his hands from the keyboard, which also take valuable time each time he has to reset his hands to the proper position. Considering the extremely high volumes of images to be processed, such delays can severely limit the output of an imaging processing center.

BRIEF SUMMARY OF THE INVENTION

Techniques are disclosed for providing a user interface and gamification system for image review processing. Images are preprocessed with a variety of image processing settings to help a user more quickly and accurately identify information from the image, while real-time progress information is provided to motivate users to work more quickly.

In one aspect, a computer implemented method for gamifying a toll image review process is provided. The method may include receiving an first image of a vehicle that has utilized a transit toll system and identifying a region of interest of the image. The region of interest may depict an identifier of the vehicle. The method may also include generating a second image that includes the region of interest and preprocessing the second image to generate a plurality of images of the region of interest. Each of the plurality of images may use unique display settings. The method may further include displaying the plurality of images within a graphical user interface on a computer screen and displaying progress information for a first user on the graphical user interface. The progress information may be related to an amount of vehicles to identify. The method may include displaying progress information for one or more additional users on the graphical user interface and receiving an input from the user interface that includes the identifier of the vehicle. The method may also include, in response to receiving the input, displaying a second plurality of images related to an image of a second vehicle's region of interest and updating the displayed progress information for the first user in response to receiving the input. The method may further include monitoring a progress of the one or more additional users and updating the displayed progress information for the one or more users based on the monitored progress.

In another aspect, a non-transitory machine-readable medium having instructions embedded thereon for gamifying a toll image review process is provided. The instructions may include computer code for receiving an first image of a vehicle that has utilized a toll road and for identifying a region of interest of the image. The region of interest may depict an identifier of the vehicle. The instructions may also include computer code for generating a second image that includes the region of interest and for preprocessing the second image to generate a plurality of images of the region of interest. Each of the plurality of images may include unique display settings. The instructions may further include computer code for displaying the plurality of images within a graphical user interface on a computer screen and for displaying progress information for a first user on the graphical user interface. The progress information may be related to an amount of vehicles to identify. The instructions may include computer code for displaying progress information for one or more additional users on the graphical user interface and for receiving an input from the user interface that includes the identifier of the vehicle. The instructions may also include computer code for, in response to receiving the input, displaying a second plurality of images related to an image of a second vehicle's region of interest and for updating the displayed progress information for the first user in response to receiving the input. The instructions may further include computer code for monitoring a progress of the one or more additional users and for updating the displayed progress information for the one or more users based on the monitored progress.

In another aspect, a system for gamifying a toll image review process is provided. The system may include a memory a communications interface, a display screen, and a processor. The processor may be configured to receive an first image of a vehicle that has utilized a transit toll system and to identify a region of interest of the image. The region of interest may depict an identifier of the vehicle. The processor may also be configured to generate a second image comprising the region of interest and to preprocess the second image to generate a plurality of images of the region of interest. Each of the plurality of images may include unique display settings. The processor may be further configured to display the plurality of images within a graphical user interface on the display screen and to display progress information for a first user on the graphical user interface. The progress information may be related to an amount of vehicles to identify. The processor may be configured to display progress information for one or more additional users on the graphical user interface and to receive an input from the user interface that includes the identifier of the vehicle. The processor may also be configured to, in response to receiving the input, display a second plurality of images related to an image of a second vehicle's region of interest and to update the displayed progress information for the first user in response to receiving the input. The processor may be further configured to monitor a progress of the one or more additional users and to update the displayed progress information for the one or more users based on the monitored progress.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
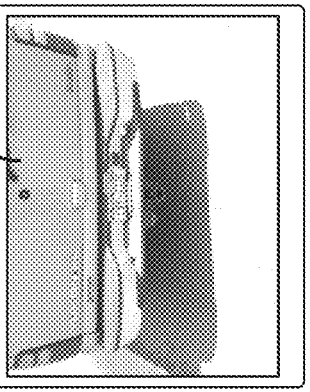
FIG. 1 is a screenshot of an image process review user interface according to embodiments.

The ensuing description provides embodiments only, and is not intended to limit the scope, applicability or configuration of the disclosure. Rather, the ensuing description of the embodiments will provide those skilled in the art with an enabling description for implementing an embodiment. In view of the disclosure, a person of ordinary skill in the art will understand various changes may be made in the function and arrangement of elements.

The present invention is directed to systems and methods for improving the image review process. Specific embodiments relate to image review for license plate numbers within a toll application. However, the systems and methods described herein may be implemented in any image review process. In toll systems, the image review process is used to correct and/or enter license plate numbers, state, and type. An image of the license plate is shown in its original form, while a grid or other array showing variations of different image processing parameter settings, such as brightness and contrast levels, is also shown to help facilitate reading the characters. An image of the overview is shown to enable the identification of the vehicle type, and therefore the plate type. The screen has fields for keying in the plate information and, if unreadable, a reject code.

The systems and methods described herein are directed to using gamification, along with a more advanced user interface, to improve the image review process, both in speed and accuracy. This is done by creating a more efficient user interface for displaying necessary content as well as providing real-time statistics and progress indicators that allow a user to monitor not only their own progress, but to compare their progress against that of one or more other users. The more efficient user interface is achieved by preprocessing images of a license plate with various image settings and rendering them on the user interface such that the user has several views to look at immediately from which to determine the correct plate number. By placing these images in a grid or other array, the user's eyes may easily discern the most clear image for quicker processing. The gamification concept takes advantage of the human nature to be competitive. By showing a user's progress, along with the progress of others performing similar image review tasks, a game-like atmosphere is created, which may motivate a user to work efficiently, whether it's for a performance related bonus, bragging rights, or personal fulfillment. The visual feedback may serve as a continuously updated motivational tool to increase productivity while also ensuring that an appropriate level of accuracy is maintained.

To further increase the efficiency, the user interfaces and processes described herein are configured to for use with a single data entry device, such as a keyboard. By eliminating the need to switch between multiple input devices, speed of image review may be increased, and the user may have a more ergonomic experience. For example, each command available to the user may be tied to a particular key and/or keys. For example, by utilizing keys such as the alt, control, tab, and/or shift keys, each function may be programmed for a specific and quickly accessed set of keystrokes. In some embodiments, increased levels of image processing or enhancement may be available using such keystroke sets. For example, by pressing "ALT+B" or another set of keys, one or more images may be brightened.

FIG. 1 depicts an example screenshot of an image process review user interface 100. User interface 100 may include several different sections. For example, user interface 100 may include an overview scene 102. Overview scene 102 may include an image 104 of all or part of a vehicle being identified. Typically, image 104 is captured by a roadway camera, such as an overhead camera that is configured to take a picture of each vehicle as it passes through an image capture field of the camera. Image 104 often includes enough of the vehicle such that the make, model, color, etc. of the vehicle may be identified. This may help a user classify a type of license plate or other vehicle identifier. For example, based on the image 104 showing the vehicle, the user may be able to determine that a license plate is a commercial, government, or personal license plate. Oftentimes, the image 104 may depict a front or rear view of the vehicle. When a rear view is used, oftentimes image 104 will show identifying information, such as a badge of the vehicle, that helps the user identify the vehicle type. The image 104 also includes a view of at least one license plate. While shown with only one image 104, it will be appreciated that some user interfaces 100 may include an image 104 of both a front and rear of the vehicle and/or the vehicle's license plates. The use of multiple views may not only further help the user identify what kind of vehicle is in the image 104, but also may provide a better opportunity to properly identify the license plate since more images are present.

User interface 100 may also include one or more region of interest or patch images 106. In some embodiments, the patch images 106 may be captured separately from the image 104 using the overhead camera, while in other embodiments, a computing device may process the image 104 to identify the license plate and then generate the patch image 106 based on this identification. Patch image 106 shows the license plate or other identifier in an un-altered state. In some embodiments, user interface 100 may include one or both of a front license plate patch image 106. In other embodiments, a user may be able to select whether a front or rear patch image 106 is shown on user interface 100, such as by clicking or otherwise interacting with a radio button or other icon on user interface 100. In some embodiments, patch image 106 may be sufficiently clear for a user to identify the license plate number. However, some license plates may be difficult to read, so user interface 100 may include a grid box 108.

Grid box 108 may include a number of processed images 110 arranged in an array. Processed images 110 include alternative versions of patch image 106. Each of the processed images 110 will have been processed with different image processing settings. Image processing settings may include brightness levels, contrast levels, gamma levels, color levels, and/or exponential/logarithmic levels. As just one example, the processed images 110 may be arranged in a grid, such as a 2×2, 3×3, and/or other M×N grid. Varying increments of different settings may be adjusted as one traverses the grid box 108. For example, along one axis, a level of contrast may be incrementally increased from a first processed image 110 to a last processed image 110 along that axis. Along the other axis, a level of brightness may be incrementally increased from the first processed image 110 to a last processed image 110 along the second axis. Diagonally from top left to bottom right, processed images 110 may have both a level of contrast and a level of brightness incrementally increased. This provides an array of images with varying image processing parameter levels for the user to view and use to identify the license plate number. The array format may arrange the images in a compact portion of the user interface 100, which not only saves space, but more easily allows a user's eye to identify and focus on a most clear image of the array. While described as a grid-like arrangement, it will be appreciated that other arrangements, such as a line of figures and/or another symmetrical or asymmetrical pattern may be used. Additionally, brightness and/or contrast levels may be decreased rather than increased and other image processing settings may be used. In some embodiments, the grid box 108 may be arranged non-incrementally or without a pattern, with each of the processed images 110 having a unique set of image processing parameter levels. In some embodiments, arrangements of processed images 110 may be random and/or customizable by a particular user. Any number of parameter levels may be adjusted for any particular image. For example, a first processed image 110 in the array may have only a contrast level adjusted relative to a standard patch image 106 from which the processed image 110 is based. A second processed image 110 may have both a contrast level and a brightness level adjusted relative to the standard patch image 106, while a third processed image 110 may have only a gamma level adjusted relative to the patch image 106. It will be appreciated that any number of combinations of image processing parameter adjustments is possible, with any number of parameters adjusted for a particular processed image 110 relative to a corresponding patch image 106.

User interface 100 may include data entry section 112. Data entry section 112 may include one or more fields in which a user may enter data. This may be where an image reviewer may add and/or verify information related to the image being reviewed. For example, a license plate number field 114, a state field 116, and/or a license plate type field 118 may be included. As the user enters data into the various data fields, the user's progress may be tracked. For example, after the user identifies a license plate number, a new set of images may be presented for identification. A progress area 120 may be updated based on completing the identification. Progress area 120 may include a completion area 122 showing how much of a current batch of work that has been completed and/or a remaining area 124 showing how much of a current batch of work that remains to be completed. The progress area 120 provides a visual status indication to the user. In some embodiments, progress area 120 may include blocks 126 that each represent a license plate that has been or will be reviewed. These blocks 126 may be color coded to provide further information. For example, a first color may be used to show completed blocks while a second color may be used to show remaining work. Additional colors may be used to indicate things such as a plate being unreadable and requiring further image processing and/or further review. In some embodiments, a block 126 may include a thumbnail of a license plate. The thumbnail may similarly be color coded, such as by including a colored border around the thumbnail. In this manner, a user may click on a particular block 126 or thumbnail if he wants to recheck a particular license plate. For example, a user may wish to conduct more advanced and/or customized image processing on a patch image 106 that was marked as unreadable. A user may wish to do the advanced image processing for all unreadable plates in a batch at a single time. By color coding the plates in the progress area 120, the user may quickly identify which plates require additional image processing. Additionally or alternatively, the progress area 120 may include a percentage or other numerical indication 128 that may alert a user as to a relative amount of work completed and/or remaining. In some embodiments, images requiring further review and/or further image processing may be moved to a separate are of the user interface 110 such that they are more easily accessed by the user.

To further enhance the gamification of the image review process, the user interface 100 may further include a performance display area 130. Performance display area 130 may include statistics of both the user's performance and of the performance of other users. This allows the user to quickly monitor his progress as compared to one or more individuals and/or groups of individuals. For example, a user rate 132 and user total 134 may be included. The user rate 132 may provide a rate of images reviewed over a particular period of time, such as over the last 10 minutes or last hour. The user total 134 may indicate the total number of images reviewed over a relevant timeframe, such as over the last hour, day, week, month, year, and/or other timeframe. Additionally, statistics related to a previous shift may be provided. For example, a user may wish to compete against a coworker that worked a previous shift. Statistics, such as a pace and/or rate of review from the previous shift may be displayed and updated based on a relative time period of a later shift. Record performances for a particular user, set of users, and/or globally within an image review system may be presented, further providing visible goals for which a user may strive to match. Additionally, performance display area 130 may also include a team rate 136 and a team total 138. These may represent statistics related to one or more other users, allowing the user to compare his own performance against that of other users. Oftentimes, the team statistics may be averages of the other users. In some embodiments, the team statistics may also be broken out into a high set of rates or totals, a low set, and/or otherwise broken up. Additionally, where feasible, such as for smaller teams, statistics for each member of the team may be provided in the performance display area 130. The computing device operating the user interface 100 may track the progress or performance of each user in real-time or near real-time. This may be achieved by receiving updated data from a central computer or server. The performance display area 130 of the user interface 100 may be dynamically updated with this information. In some embodiments, a scoreboard may be provided. The order of users listed on the scoreboard may be dynamically adjusted in real-time or near real-time such that a leader in a particular statistic is displayed at the top of the leaderboard. In some embodiments, multiple leaderboards may be provided. Each leaderboard may be provided on the performance display area 130 and/or one or more leaderboards may be shown at any given time. A leaderboard may be displayed on a large, wall mounted, monitor, showing only leaderboard information for the work team. The user may select one or more leaderboards to be displayed, or the leaderboards may each be displayed for a particular amount of time before displaying a different leaderboard. Such continuously updating leaderboards and/or statistics may enhance the game-like feel of the image review process, as a user may be motivated to keep his name at or near the top of the leaderboard. In some embodiments, a user may be able to populate a group of individuals to monitor. For example, a user may select a group of friends and/or a group of coworkers that work in a similar area to compete with. The selected users may have their progress and/or performance tracked and the leaderboards may include only the selected people. This allows for customized competitions amongst friends or departments. Such customized contests may also allow for a user to select a particular statistic to track. While discussed here as rate and total statistics, other statistics and metrics such as % correct, % error, peak rate, among others, may be utilized.

User interface 100 may also include a reject reason list 140 that includes a number of reasons that a user may mark a particular license plate as being unreadable. For example, the image may be too blurry, only include a partial image, the plate may be obscured, and the like. The user may select a reason, and in some embodiments, the images of the license plate may be saved for more advanced and/or customized image processing. For example, the images may be adjusted using an image processing interface where the user or another user may adjust specific image processing settings, such as by entering color level values, manipulating sliders for controlling settings of various image processing parameters, and the like.

Figure 2:
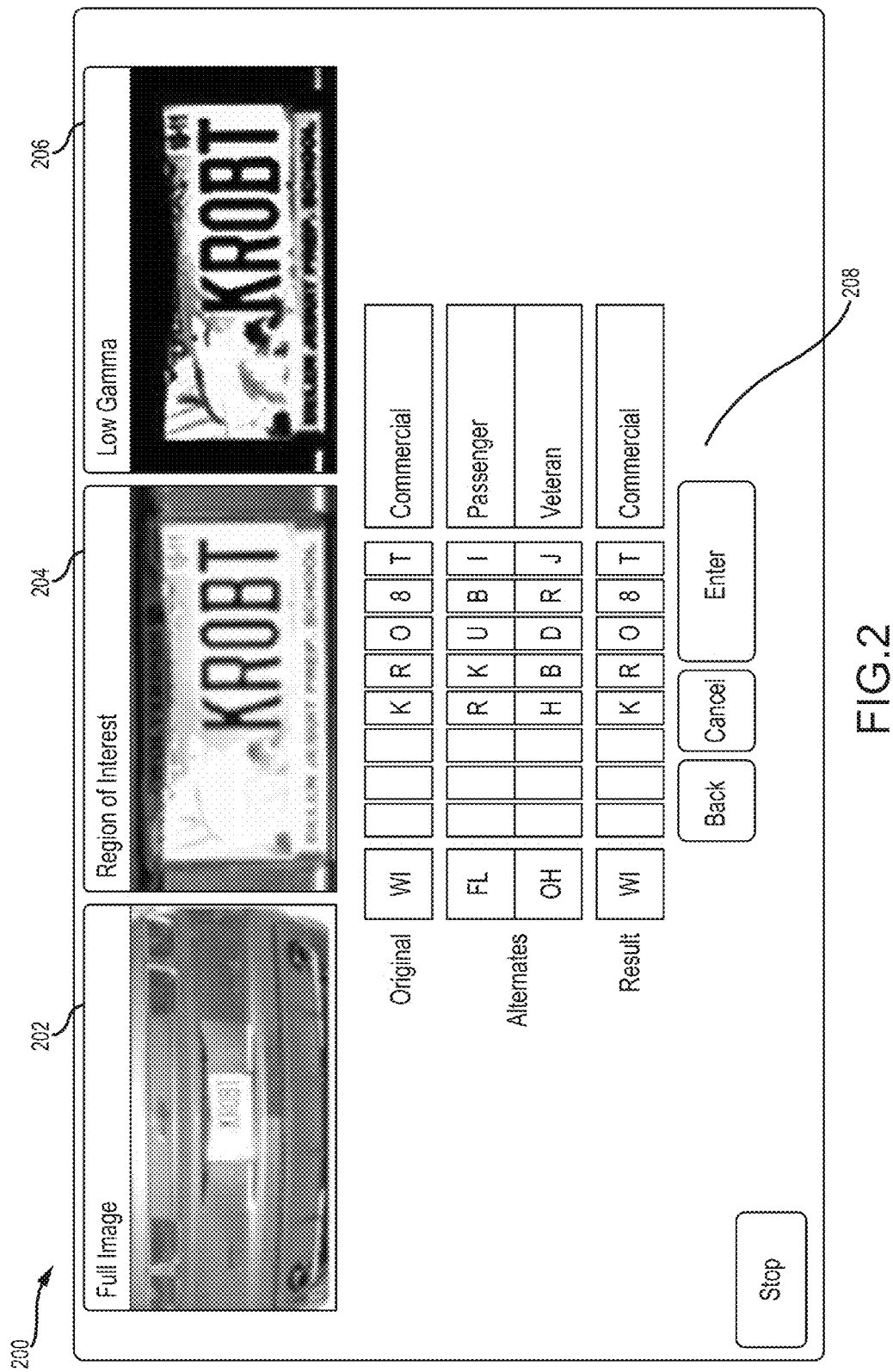
FIG. 2 is a simple user interface 200 for an image review process according to embodiments.

FIG. 2 depicts a simple user interface 200 for an image review process. User interface 200 may include an image 202 of a vehicle being identified and a patch image or region of interest image 204. These images may be similar to those described in FIG. 1. User interface 200 may also include a processed image 206. Processed image 206 may include one or more versions of region of interest image 204 that have been processed using predefined image processing settings. Here, processed image 206 has been processed with a low gamma level, causing the license plate number to be bolded and stand out better. A data entry section 208 may also be included. In some embodiments, the data entry section 208 may include computerized guesses of the license plate numbers. For example, the computing device may execute an optical character recognition (OCR) program and/or other image processing operation that allows the computing device to make an attempt at identifying the license plate number, state, and/or type. This attempt may be presented to the user as part of the data entry section 208 such that the user may review the information and either correct or approve the information where needed. This pre-filled data may further increase the speed of review for a user. In some embodiments, all or part of the license plate identifier may be filled in with a guess by the computing device. For example, some computing devices may be programmed to insert a guessed character anytime a character is identified, while other computing devices may be programmed to only insert a guessed character when the guess meets a predefined confidence threshold.

It will be appreciated that the arrangement of various areas of the user interfaces described herein may be rearranged. Additionally, new areas may be added, some areas removed, areas combined or broken apart, and/or other combinations of areas may be used in accordance with this invention. As one example, the grid box sections may be initially hidden from view to save space on the user interface. If a user cannot easily read the region of interest image, the user may user a set of keystrokes to bring up the grid box showing the enhanced images. Each user may be able to customize some of the sets of keystrokes, as well as a default operation and appearance of the user interface. As another example, the progress area may be divided into separate completed and remaining sections. The remaining plates or blocks may be displayed on a left side of the user interface and the completed plates or blocks may be presented on the right side of the user interface, or vice versa. In some embodiments, the completed blocks may be stacked from bottom to top in the progress area such that there is an appearance of building a wall of bricks, similar to games such as Tetris®, which further adds to the game-like feel. It will be appreciated that further visual enhancements, such as animations or videos provided upon completion of a batch of work or other milestone may further add to the gamification of such systems. For example, various animations, videos, and/or other audio and/or visual indications may be provided as a user moves up or down a leaderboard, sets a record, has a record fall, and/or other milestones are set.

Figure 3:
FIG. 3 depicts a grid box according to embodiments.

FIG. 3 depicts an example of a grid box 300, such as those used in the user interfaces described above. Grid box 300 may include a number of images 302 that together form a grid. The grid box 300 may have any dimensions formed form any number of images 302. In some embodiments, grid box 300 may be square, such as having N×N dimensions, be rectangular, such as having M×N dimensions, and/or other shapes of images 302. In some embodiments, two different types of image processing will be done on each of the images 302, to various degrees. For example, from column 1 to column N a brightness level may be increased, while from row 1 to row M a contrast level may be increased. This provides an array of incrementally changing grid of images 302. Thus, images 302 progressing from the top left image 302 to the bottom right image 302 display both increasing contrast and brightness levels. The various images should provide the user with a useable view in most cases. Other image processing settings may be adjusted, and in some cases more than two image processing settings may be changed on each figure. In other embodiments, the array of figures may not be arranged in an incremental fashion. For example, the grid box 300 may include an array of images 302 that include image processing settings that have been most effective in the past. For example, a particular state's license plate or license plate design may be more readable with particular image settings. Settings that correspond to the most commonly observed plates within the region of a particular toll system may be stored and used as the settings for images 302 within the grid box 300. Any number of parameters may be adjusted to provide a variety of views and further increase the likelihood that one of the images shows the license plate identifier clearly. Additionally, each user may be able to customize the settings that make up the images 302 of grid box 300.

Each of the images 302 is preprocessed with predefined settings such that when first displayed on a user interface, grid box 300 is rendered with each of the images 302 having with the predefined image processing parameter settings. Thus, the computing device is specially programmed to preprocess each image within a work batch such that the images are properly rendered when each license plate is reviewed. This allows the users to quickly review the license plates with commonly used image settings as soon as each plate is rendered on the user interface.

Various image processing parameters/functions used in grid box 300 may include, without limitation, a brightness level, a contrast level, a gamma level, a color levels, and/or an exponential/logarithmic level. These levels may be adjusted separately or in combination with one another to achieve a desired appearance of the processed image.

Figure 4:
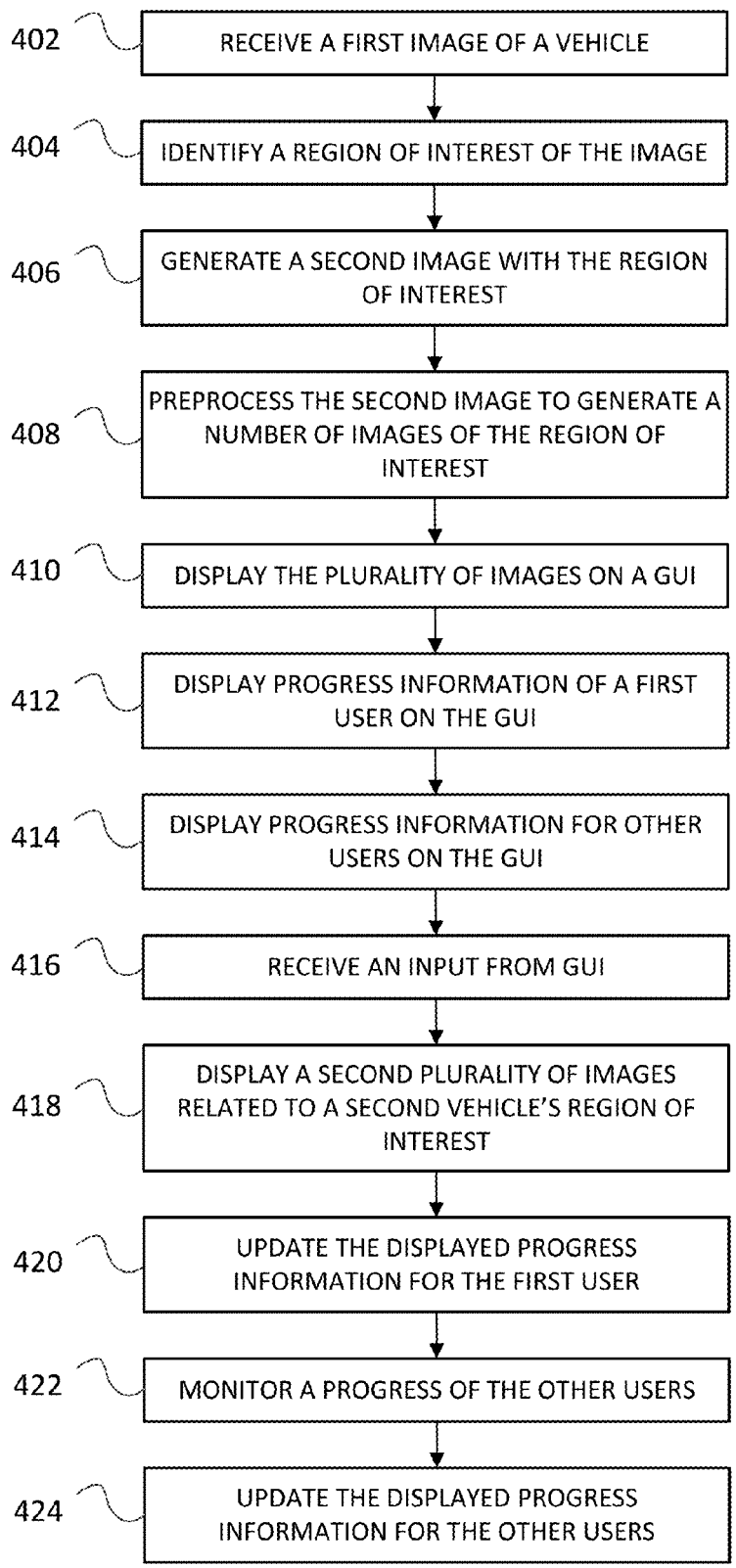
FIG. 4 depicts a flowchart of a process for gamifying a toll image review process according to embodiments.

FIG. 4 depicts a flowchart of a process 400 for gamifying a toll image review process. At block 402, a first image of a vehicle that has utilized a toll road is received. A region of interest of the image is identified at block 404. The region of interest may depict an identifier of the vehicle. A second image is generated that includes the region of interest at block 406. At block 408, the second image is preprocessed to generate a plurality of images of the region of interest. Each of the plurality of images may include unique display settings. For example, the unique display settings may include predetermined settings for brightness levels, contrast levels, gamma levels, color levels, and/or exponential/logarithmic levels. At block 410, the plurality of images are displayed within a graphical user interface on a computer screen. In some embodiments, the plurality of images are arranged as a rectangular array on the graphical user interface. In some embodiments, the rectangular array may include multiple columns and rows, with each of the columns and rows containing multiple images of the plurality of images. A first image of the multiple images in each row may have a first level of a first image processing parameter and a second image of the multiple images in each row may have a second level of the first image processing parameter. A first image of the multiple images in each column may have a first level of a second image processing parameter and a second image of the multiple images in each column may have a second level of the second image processing parameter. In other words, a level of the first image processing parameter of each of the multiple images in each row is higher than the level of the first image processing parameter of a subsequent image of the multiple images in each row such as by incrementally increasing a level of the first image processing parameter for each of the plurality of images along a first axis of the array. A level of the second image processing parameter of each of the multiple images in each column is higher than the level of the second image processing parameter of a subsequent image of the multiple images in each column such as by incrementally increasing a level of the second image processing parameter for each of the plurality of images along a second axis of the array.

In some embodiments, each of the images may include a first image processing parameter and a second image processing parameter. For example, each image may include a unique setting related to a brightness and a contrast of the image. In some embodiments, the first and/or second parameter of each figure may be related to a different parameter than for other images. In some embodiments, a level of at least one of the first image processing parameter and the second image processing parameter of a first image of the plurality of images is different than a level of at least one of the first image processing parameter and the second image processing parameter of a second image of the plurality of images. In some embodiments, at least one image of the plurality of images has an image processing parameter level unique to only that image. In one particular embodiment, the first image processing parameter may be a brightness level and the second image processing parameter may be a contrast level Progress information for a first user is also displayed on the graphical user interface at block 412. The progress information may be related to an amount of vehicles to identify. The progress information for the first user may include a first set of icons and a second set of icons. The first set of icons may represent a number of images left to review and the second set of icons may represent a number of images already reviewed. In some embodiments, one icon is removed from the first set of icons and added to the second set of icons after the input is received At block 414, progress information for one or more additional users is displayed on the graphical user interface. The progress information may include statistical information related to a rate of completion. An input is received from the user interface that includes the identifier of the vehicle at block 416. At block 418, in response to receiving the input, a second plurality of images related to an image of a second vehicle's region of interest is displayed. At block 418, the displayed progress information for the first user is updated in response to receiving the input. A progress of the one or more additional users is monitored at block 420. For example, one or more statistics may be tracked or maintained for one or all of the users. The displayed progress information for the one or more users is updated based on the monitored progress at block 422. In some embodiments, an audio and/or visual indication may be generated upon the first user achieving a specified image reviewing milestone. update, in real-time, a leaderboard presented on the user interface with an ordered ranking of each of the users based on the at least one statistic.

Figure 5:
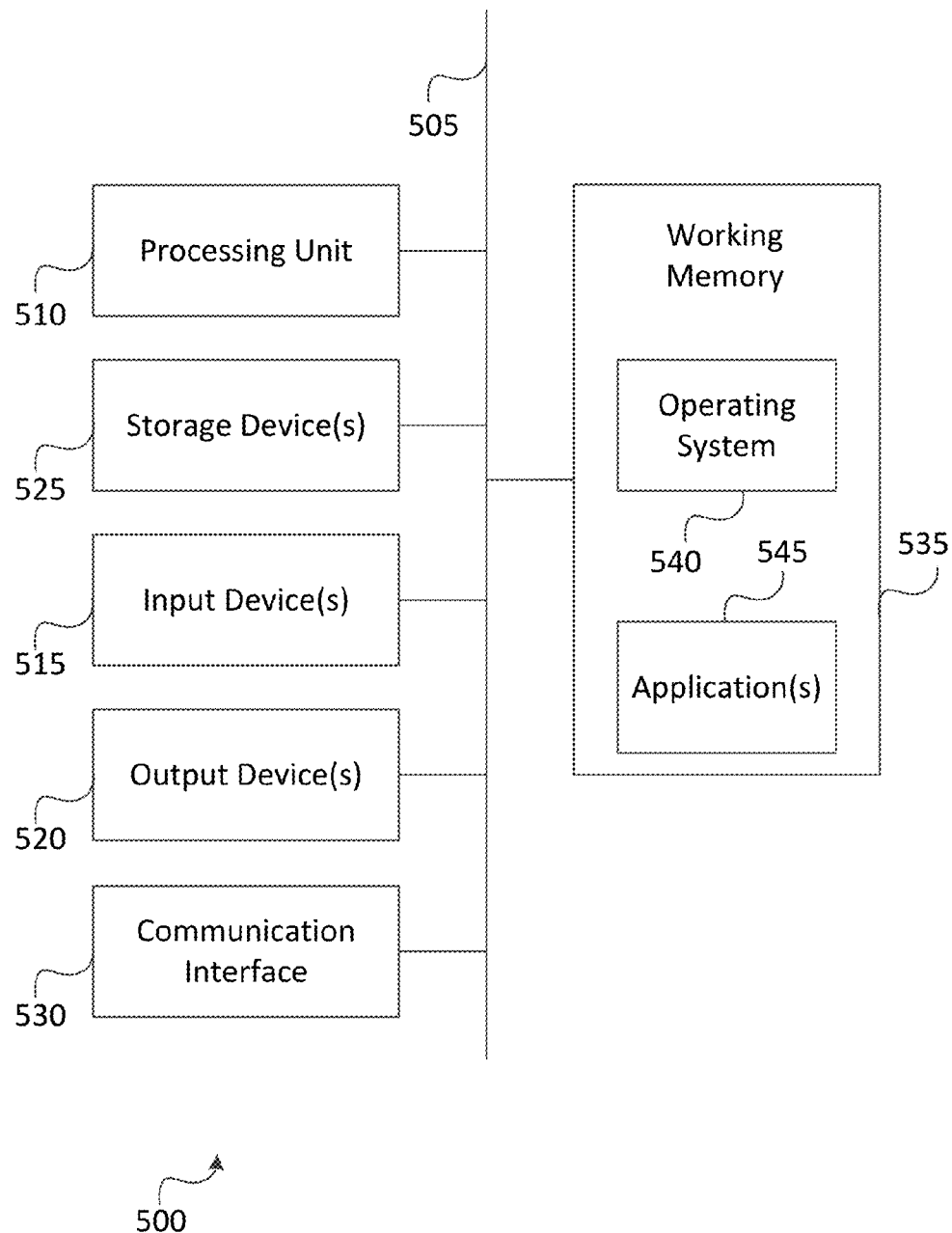
FIG. 5 is a computer system according to embodiments.

A computer system as illustrated in FIG. 5 may be incorporated as part of the previously described computerized devices. For example, computer system 500 can represent some of the components of the image capture devices, positional sensors, fare access gates and/or central servers described herein. FIG. 5 provides a schematic illustration of one embodiment of a computer system 500 that can perform the methods provided by various other embodiments, as described herein. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more general-purpose processors and/or one or more special-purpose processors (such as digital signal processing chips, graphics acceleration processors, and/or the like); one or more input devices 515, which can include without limitation a mouse, a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a WIFI wireless networking standard device, a WIMAX wireless networking standard device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A computer-implemented method for processing and displaying images for a toll image review process, the method comprising:
   receiving a first image of a first vehicle that has utilized a toll road;
   identifying a region of interest of the image, the region of interest depicting an identifier of the first vehicle;
   generating a second image comprising the region of interest;
   preprocessing the second image to generate a plurality of images of the region of interest, each of the plurality of images comprising unique display settings;
   displaying the plurality of images within a graphical user interface on a computer screen;
   receiving an input from the graphical user interface comprising the identifier of the first vehicle; and
   in response to receiving the input, displaying a second plurality of images related to an image of a second vehicle's region of interest.

2. The computer-implemented method for processing and displaying images for a toll image review process of claim 1, wherein:
   the unique display settings comprise predetermined settings comprising one or more of brightness levels, contrast levels, gamma levels, color levels, or exponential/logarithmic levels.

3. The computer-implemented method for processing and displaying images for a toll image review process of claim 1, wherein:
   the plurality of images are arranged as a rectangular array on the graphical user interface; and
   each of the plurality of images comprises a first image processing parameter and a second image processing parameter.

4. The computer-implemented method for processing and displaying images for a toll image review process of claim 3, wherein:
   a level of at least one of the first image processing parameter and the second image processing parameter of a first image of the plurality of images is different than a level of at least one of the first image processing parameter and the second image processing parameter of a second image of the plurality of images.

5. The computer-implemented method for processing and displaying images for a toll image review process of claim 3, wherein:
   the first image processing parameter comprises a brightness level and the second image processing parameter comprises a contrast level.

6. The computer-implemented method for processing and displaying images for a toll image review process of claim 3, wherein:
   the rectangular array comprises multiple columns and rows, each of the columns and rows containing multiple images of the plurality of images;
   a first image of the multiple images in each row comprises a first level of the first image processing parameter and a second image of the multiple images in each row comprises a second level of the first image processing parameter; and
   a first image of the multiple images in each column comprises a first level of the second image processing parameter and a second image of the multiple images in each column comprises a second level of the second image processing parameter.

7. The computer-implemented method for processing and displaying images for a toll image review process of claim 6, wherein:
   a level of the first image processing parameter of each of the multiple images in each row is higher than the level of the first image processing parameter of a subsequent image of the multiple images in each row; and
   a level of the second image processing parameter of each of the multiple images in each column is higher than the level of the second image processing parameter of a subsequent image of the multiple images in each column.

8. The method for processing and displaying images for a toll image review process of claim 1, further comprising:
   displaying progress information for a first user on the graphical user interface, the progress information being related to an amount of vehicles to identify; and
   displaying progress information for one or more additional users on the graphical user interface.

9. The method for processing and displaying images for a toll image review process of claim 8, further comprising:
   updating the displayed progress information for the first user in response to receiving the input;
   monitoring a progress of the one or more additional users; and
   updating the displayed progress information for the one or more users based on the monitored progress.

10. A non-transitory machine-readable medium having instructions embedded thereon for processing and displaying images for a toll image review process, instructions including computer code for:
    receiving a first image of a first vehicle that has utilized a toll road;
    identifying a region of interest of the image, the region of interest depicting an identifier of the first vehicle;
    generating a second image comprising the region of interest;
    preprocessing the second image to generate a plurality of images of the region of interest, each of the plurality of images comprising unique display settings;
    displaying the plurality of images within a graphical user interface on a computer screen;
    receiving an input from the user interface comprising the identifier of the first vehicle; and
    in response to receiving the input, displaying a second plurality of images related to an image of a second vehicle's region of interest.

11. The non-transitory computer-readable medium of claim 10, wherein:
    the plurality of images are arranged as a rectangular array on the graphical user interface; and
    each of the plurality of images comprises a first image processing parameter and a second image processing parameter.

12. The non-transitory computer-readable medium of claim 11, wherein:
    a level of the first image processing parameter is incrementally increased for each of the plurality of images along a first axis of the array; and
    a level of the second image processing parameter is incrementally increased for each of the plurality of images along a second axis of the array.

13. The non-transitory computer-readable medium of claim 11, wherein:
    a level of at least one of the first image processing parameter and the second image processing parameter of a first image of the plurality of images is different than a level of at least one of the first image processing parameter and the second image processing parameter of a second image of the plurality of images.

14. The non-transitory computer-readable medium of claim 11, wherein:
the first image processing parameter comprises a brightness level and the second image processing parameter comprises a contrast level.

15. The non-transitory computer-readable medium of claim 11, wherein:
at least one image of the plurality of images comprises an image processing parameter level unique to only the one image.

16. The non-transitory computer-readable medium of claim 10, wherein:
the unique display settings comprise predetermined settings comprising one or more of brightness levels, contrast levels, gamma levels, color levels, or exponential/logarithmic levels.

17. The non-transitory computer-readable medium of claim 10, further comprising instructions including computer code for:
displaying progress information for a first user on the graphical user interface, the progress information being related to an amount of vehicles to identify; and
displaying progress information for one or more additional users on the graphical user interface.

18. The non-transitory computer-readable medium of claim 17, further comprising instructions including computer code for:
updating the displayed progress information for the first user in response to receiving the input;
monitoring a progress of the one or more additional users; and
updating the displayed progress information for the one or more users based on the monitored progress.

19. A system for processing and displaying images for a toll image review process, the system comprising:
a memory;
a communications interface;
a display screen; and
a processor configured to:
receive a first image of a first vehicle that has utilized a toll road;
identify a region of interest of the image, the region of interest depicting an identifier of the first vehicle;
generate a second image comprising the region of interest;
preprocess the second image to generate a plurality of images of the region of interest, each of the plurality of images comprising unique display settings;
display the plurality of images within a graphical user interface on the display screen;
receive an input from the user interface comprising the identifier of the first vehicle; and
in response to receiving the input, display a second plurality of images related to an image of a second vehicle's region of interest.

20. The system for processing and displaying images for a toll image review process of claim 19, wherein the processor is further configured to:
display progress information for a first user on the graphical user interface, the progress information being related to an amount of vehicles to identify; and
display progress information for one or more additional users on the graphical user interface.

21. The system for processing and displaying images for a toll image review process of claim 20, wherein the processor is further configured to:
update the displayed progress information for the first user in response to receiving the input;
monitor a progress of the one or more additional users; and
update the displayed progress information for the one or more users based on the monitored progress.

22. The system for processing and displaying images for a toll image review process of claim 20, wherein:
the progress information comprises statistical information related to a rate of completion.

23. The system for processing and displaying images for a toll image review process of claim 20, wherein:
the progress information for the first user comprises a first set of icons and a second set of icons, the first set of icons representing a number of images left to review, the second set of icons representing a number of images already reviewed.

24. The system for processing and displaying images for a toll image review process of claim 23, wherein:
the processor is further configured to remove one icon from the first set of icons and to add one icon to the second set of icons after the input is received.

25. The system for processing and displaying images for a toll image review process of claim 20, wherein:
the processor is further configured to generate an audio and/or visual indication upon the first user achieving a specified image reviewing milestone.

26. The system for processing and displaying images for a toll image review process of claim 20, wherein:
the processor is further configured to maintain at least one statistic for the user and each of the one or more additional users; and
update, in real-time, a leaderboard presented on the user interface with an ordered ranking of each of the users based on the at least one statistic.

* * * * *